(12) United States Patent
Choi et al.

(10) Patent No.: US 7,978,657 B2
(45) Date of Patent: Jul. 12, 2011

(54) MULTI-RADIO MESH NETWORK SYSTEM SUPPORTING AT LEAST TWO DIFFERENT WIRELESS COMMUNICATION STANDARDS AND METHOD OF CONTROLLING THE SAME

(75) Inventors: Wook Choi, Hwaseong-si (KR); Yong Lee, Seoul (KR); Hyo-Hyun Choi, Seoul (KR); Yong-Seok Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 966 days.

(21) Appl. No.: 11/898,917

(22) Filed: Sep. 17, 2007

(65) Prior Publication Data

US 2008/0080430 A1 Apr. 3, 2008

(30) Foreign Application Priority Data

Sep. 29, 2006 (KR) .................. 10-2006-0095888

(51) Int. Cl.
*H04Q 7/00* (2006.01)
(52) U.S. Cl. ........ 370/332; 370/232; 370/235; 370/338; 370/437
(58) Field of Classification Search .......... 370/230, 370/232, 235, 238, 329, 338, 437
See application file for complete search history.

(56) References Cited

U.S. PATENT DOCUMENTS

| 7,116,640 | B2 * | 10/2006 | Tasman et al. ............... 370/252 |
| 7,248,570 | B2 * | 7/2007 | Bahl et al. ................... 370/329 |
| 7,327,683 | B2 * | 2/2008 | Ogier et al. .................. 370/236 |
| 7,505,450 | B2 * | 3/2009 | Castagnoli ................... 370/350 |
| 7,505,751 | B1 * | 3/2009 | Backes ......................... 455/332 |
| 7,570,593 | B1 * | 8/2009 | ElBatt et al. ................. 370/238 |
| 7,616,600 | B2 * | 11/2009 | Sparr et al. .................. 370/329 |
| 2002/0181427 | A1 * | 12/2002 | Sparr et al. ................ 370/338 |
| 2003/0235175 | A1 * | 12/2003 | Naghian et al. ............ 370/338 |
| 2004/0008659 | A1 * | 1/2004 | Kim ............................ 370/342 |
| 2005/0068965 | A1 * | 3/2005 | Lin et al. ................. 370/395.21 |

(Continued)

OTHER PUBLICATIONS

Dimou, et al., entitled *"Generic Link Layer: A Solution for Multi-Radio Transmission Diversity in Communication Networks Beyond 3G,"* IEEE INFORCOM, pp. 1672-1676, 2005.

(Continued)

*Primary Examiner* — Ayaz R Sheikh
*Assistant Examiner* — Andrew C Lee
(74) *Attorney, Agent, or Firm* — H.C. Park & Associates, PLC

(57) ABSTRACT

In a multi-radio mesh network system supporting at least two different wireless communication standards and a method of controlling the same, a wireless access switching module determines whether user data en-queued in the queue of a first wireless link and retained on standby cannot be transmitted. The wireless access switching module switches the user data, en-queued in the queue of the first wireless link and retained on standby, to an available second wireless link. The wireless access switching module changes a frame structure according to different wireless access techniques. When access is possible through the second wireless link, a forwarder searches for a local neighbor directly connected to a transmitting node and a receiving node, and forwards the user data. According to the invention, and in contrast to conventional techniques, available multi-wireless resources can be used more efficiently, flexibly and optimally up to the last moment, thereby reducing re-transmission and packet drop. Thus, each hop supports fast data forwarding so as to improve network performance.

22 Claims, 5 Drawing Sheets

U.S. PATENT DOCUMENTS

| | | | |
|---|---|---|---|
| 2005/0135403 A1* | 6/2005 | Ketchum et al. | 370/437 |
| 2005/0232179 A1* | 10/2005 | daCosta et al. | 370/315 |
| 2006/0133315 A1* | 6/2006 | Eriksson et al. | 370/331 |
| 2006/0285529 A1* | 12/2006 | Hares et al. | 370/338 |
| 2007/0160017 A1* | 7/2007 | Meier et al. | 370/338 |
| 2007/0230493 A1* | 10/2007 | Dravida et al. | 370/412 |
| 2008/0013514 A1* | 1/2008 | Lee et al. | 370/338 |
| 2008/0040509 A1* | 2/2008 | Werb et al. | 709/242 |

OTHER PUBLICATIONS

Koudouridis, et al., entitled "*Multi-Radio Access in Ambient Networks*," IEEE INFORCOM.

Choi, et al., entitled "*A Proxy Based Indirect Routing Scheme for AD HOC Wireless Networks*," IEEE INFORCOM, pp. 1395-1404, 2002.

\* cited by examiner

MULTI-RADIO MESH NETWORK SYSTEM SUPPORTING AT LEAST TWO DIFFERENT WIRELESS COMMUNICATION STANDARDS AND METHOD OF CONTROLLING THE SAME

CLAIM OF PRIORITY

This application makes reference to, incorporates the same herein, and claims all benefits accruing under 35 U.S.C. §119 from an application for MULTI-RADIO MESH NETWORK SYSTEM SUPPORTING AT LEAST TWO DIFFERENT WIRELESS COMMUNICATION STANDARDS AND METHOD OF CONTROLLING THE SAME earlier filed in the Korean Intellectual Property Office on the 29 Sep. 2006 and there duly assigned Serial No. 2006-95888.

BACKGROUND OF THE INVENTION

1. Technical Field

The present invention relates to a multi-radio mesh network system supporting at least two different wireless communication standards and a method of controlling the same.

2. Related Art

In general, unlike conventional wired networks, wireless networks have many limits in performance due to unique characteristics of wireless data communication, such as signal interference upon data transmission/reception, etc.

In order to overcome such fundamental limits, there is ongoing research and development aimed at building a single network which would reduce signal interference and maximize throughput using various wireless access techniques.

Such research and development has been further accelerated by the development of a chip supporting multi-radio, as well as advances in wireless technology and hardware manufacturing technology.

In a wireless network, a common transceiver operates in a half-duplex mode. In other words, one transceiver cannot simultaneously perform data transmission and reception. When one node within a transmission/reception range performs transmission/reception, signal interference interrupts a counterpart's communication.

Recently, to overcome the limits of wireless communication, a multi-hop mesh network has sometimes been built.

In this respect, according to a multi-hop mesh, multi-wireless communication standards, such as Institute of Electrical and Electronics Engineers (IEEE) 802.11a/b/g, world interoperability for microwave access (WiMAX), etc., are used. Several hardware interfaces using the same wireless communication standard are installed at one node, and mutually orthogonal channels are allocated to the respective interfaces, thereby enabling simultaneous transmission/reception without signal interference and increasing the throughput of the conventional multi-hop mesh wireless network.

In addition, according to different wireless communication standards, a user access link and a mesh link are sometimes classified and used.

Using the above-mentioned method, wireless mesh networks which are currently under development maximize the throughput of a wireless multi-hop backhaul network while minimizing signal interference.

However, the Ambient Network project of wireless world research forum (WWRF) suggests one multi-radio architecture in a conventional multi-hop mesh network.

The architecture has been suggested to use optimal wireless resources when current terminals are improved so as to access several access networks using several wireless techniques. To use several wireless resources in the architecture, the following three concepts are mentioned:

1) Multi-radio Transmission Diversity (MRTD);
2) Multi-radio Multi-hop (MRMH); and
3) Multi-route Transmission Diversity (MroTD).

Multi-radio access is a fundamentally different wireless access technique or denotes wireless access using an uncoupled wireless channel in single wireless technology.

In such a multi-wireless environment, of the three types, MRTD is enabled by a wireless re-selection rate, data parallelism by simultaneous multi-radio access, and duplicate data transmission to multi-radio access for transmitting reliable data.

The fundamental architecture of the suggested MRTD necessarily requires constant, periodic monitoring of a wireless resource state to select wireless resources for MRTD.

A monitoring result is provided as feedback to an access selector, optimal wireless resources are selected on the basis of the monitoring result, and user data to be transmitted is transferred to a lower layer.

In this regard, the data transferred to a specific wireless link of the lower layer is stored in the queue of the corresponding wireless link according to a traffic load to be transmitted, and is retained on standby until it is transmitted.

Therefore, when a problem occurs for some reason at a selected wireless link, the user data to be transmitted is dropped or retained on standby until the link returns to a normal state. Thus, the suggested MRTD is excessively dependent on a used time scale in a measured report. In other words, the MRTD does not efficiently cope with variation in the state of a wireless link over time.

SUMMARY OF THE INVENTION

It is an objective of the present invention to provide a multi-radio mesh network system supporting at least two different wireless communication standards and a method of controlling the same, the system and method switching user data transferred so as to be transmitted to another wireless link according to a link state after selecting a link to be used for transmission, thereby minimizing loss of the user data.

A first aspect of the present invention provides a method of controlling a multi-radio mesh network system supporting at least two different wireless communication standards, the method comprising the steps of: determining, at a wireless access switching module, whether user data en-queued in a queue of a first wireless link and retained on standby cannot be transmitted; switching, at the wireless access switching module to an available second wireless link, the user data en-queued in the queue of the first wireless link and retained on standby; changing, at the wireless access switching module, a frame structure according to different wireless access techniques; and, when access is possible through the second wireless link, searching at a forwarder for a local neighbor directly connected to a transmitting node and a receiving node, and forwarding the user data.

The method may further comprise the steps of: providing, at a neighbor provider, its neighbor information to a neighboring node; and generating, at a neighbor generator, a neighbor table based on neighbor information received from the neighboring node.

In this regard, the neighbor information may include information on each wireless link established through the corresponding node.

The method may further comprise the step of: generating, at a multi-radio path selector, a forwarding information base (FIB) with reference to the neighbor table. In this regard, the FIB may include destination information of the user data and neighbor information of the same wireless link.

The step of switching the user data to an available second wireless link may comprise the steps of: searching, at the wireless access switching module, the FIB generated by the multi-radio path selector and selecting a wireless link for transmitting the user data; attempting, at the wireless access switching module, to transmit the user data through the selected wireless link and determining whether there is a fault in the wireless link; and, when it is determined in the step of determining whether there is a fault in the wireless link that there is a fault in the wireless link, re-searching, at the wireless access switching module, the FIB, checking a next wireless link (i.e., hop), and then switching to an existing wireless link.

Meanwhile, in the step of changing, at the wireless access switching module, a frame structure according to different wireless access techniques, only a corresponding frame among the user data en-queued in the first wireless link in which a fault has occurred may be de-queued and re-queued in the second wireless link, or all of the user data en-queued in the first wireless link in which a fault has occurred may be de-queued and re-queued in the second wireless link. In this respect, the change may be performed in an upper media access control (MAC) layer.

In the step of searching for a local neighbor and forwarding the user data when the available second wireless link can indirectly access a next wireless link to which the data must be transmitted, the user data may be forwarded through a common neighbor to which the transmitting node and the receiving node are connected in common when there is no local neighbor.

A second aspect of the present invention provides a multi-radio mesh network system supporting at least two different wireless communication standards, the system comprising: a wireless access switching module which, when a first wireless link for transmitting user data is down or a fault has occurred in the first wireless link for some reason so that the user data cannot be transmitted, switches the user data en-queued in a queue of the first wireless link and retained on standby to an available second wireless link; a data converter for changing a frame structure according to different wireless access techniques; and a forwarder for searching for a local neighbor directly connected to a transmitting node and a receiving node, and forwarding the user data when access is possible through the second wireless link.

In this regard, the wireless access switching module may search an FIB generated by a multi-wireless-path selector and select a wireless link for the forwarder to transmit the user data, attempt to transmit the user data through the selected wireless link, and determine whether there is a fault in the wireless link, and when there is a fault in the wireless link, the wireless access switching module may re-search the FIB, check a next wireless link (i.e., hop), and then switch to an existing wireless link.

The data converter may de-queue only a corresponding frame among the user data en-queued in the first wireless link in which a fault has occurred, and re-queue the frame in the second wireless link, or the data converter may de-queue all of the user data en-queued in the first wireless link in which a fault has occurred, and re-queue all of the user data in the second wireless link.

In addition, the forwarder may forward the user data through a common neighbor to which the transmitting node and the receiving node are connected in common when there is no local neighbor.

The system may further comprise: a neighbor provider for providing its neighbor information to a neighboring node; and a neighbor generator for generating a neighbor table based on neighbor information received from the neighboring node. In this regard, the neighbor information may include information on each wireless link established through the corresponding node.

In addition, the system may further comprise a multi-radio path selector for generating an FIB with reference to the neighbor table. In this regard, the FIB may include destination information of the user data and neighbor information consisting of the same wireless link.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, exemplary embodiments of the present invention will be described in detail with reference to the accompanying drawings. A detailed description of known functions and configurations incorporated into the invention has been omitted for conciseness. The following description concerns exemplary embodiments in which the present invention is applied to a multi-radio mesh network system supporting at least two wireless communication standards and a method of controlling the same. The following exemplary embodiments are described to aid in understanding the present invention and to fully enable those of ordinary skill in the art to embody and practice the invention. They are not to be interpreted as limiting the scope of the present invention.

Figure 1:
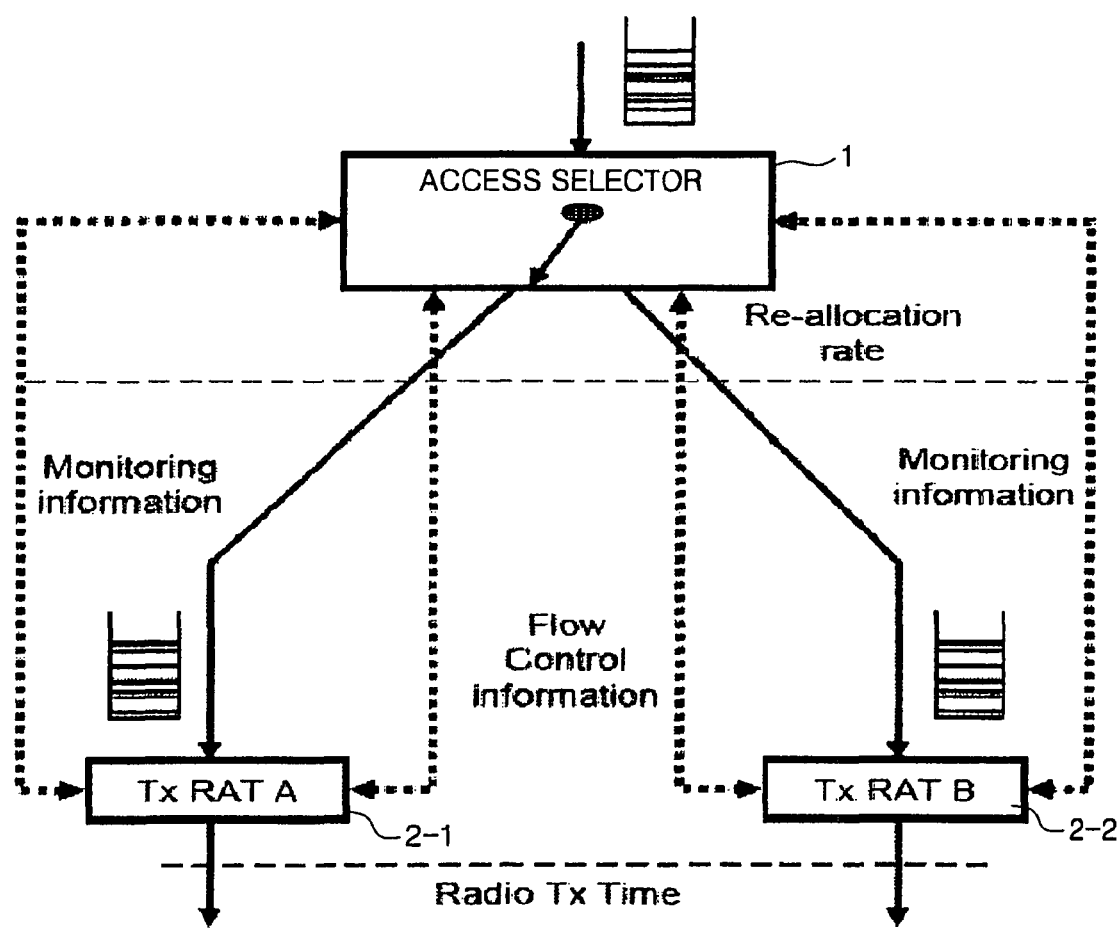
FIG. 1 is a functional block diagram showing multi-radio transmission diversity (MRTD) of a multi-radio mesh network.

FIG. 1 is a functional block diagram showing multi-radio transmission diversity (MRTD) of a multi-radio mesh network.

As illustrated in FIG. 1, the fundamental architecture of the suggested MRTD necessarily requires constant, periodic monitoring of a wireless resource state to select wireless resources for MRTD.

A monitoring result is provided as feedback to an access selector 1, optimal wireless resources are selected on the basis of the monitoring result, and user data to be transmitted is transferred to a lower layer.

The data transferred to a specific wireless link of the lower layer is stored in the queue of the corresponding wireless link 2-1 or 2-2 according to a traffic load to be transmitted, and is retained on standby until it is transmitted.

Figure 2:
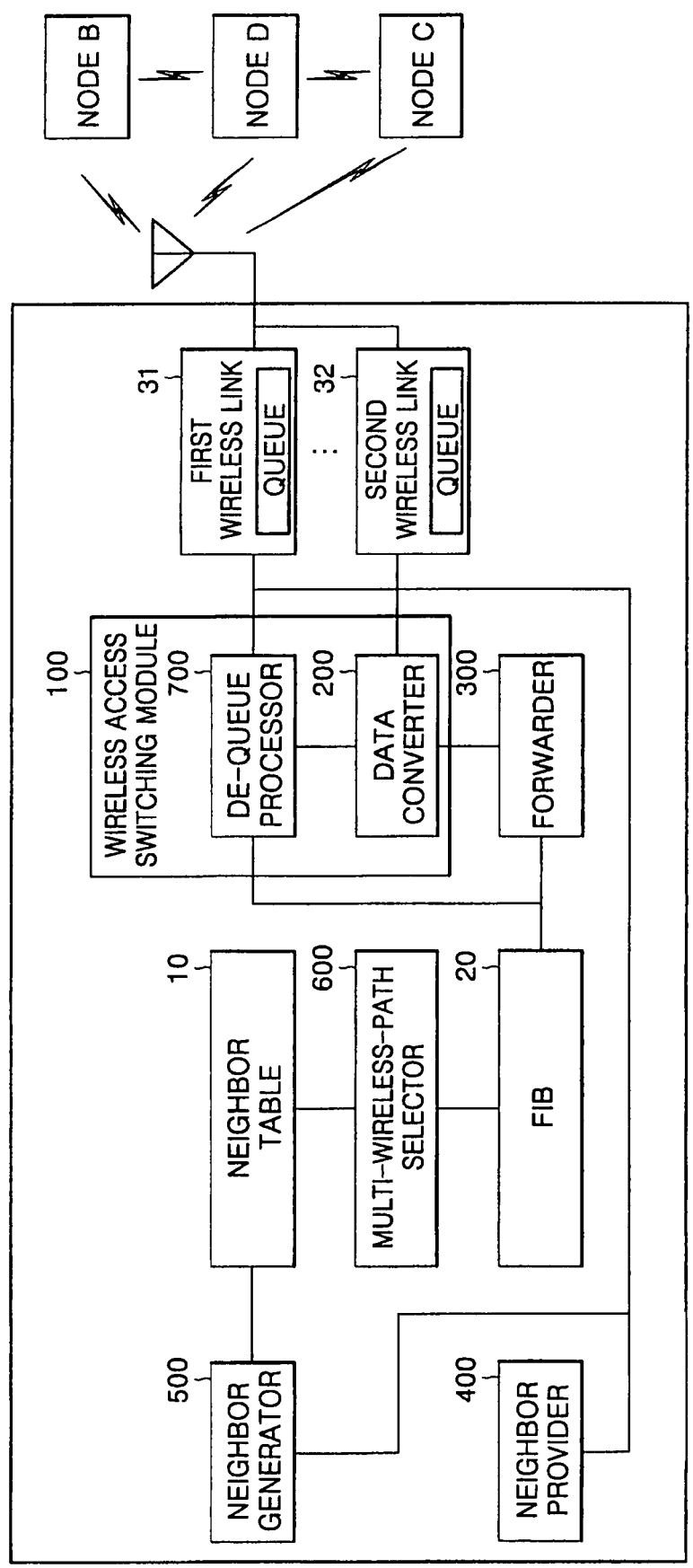
FIG. 2 is a block diagram of a multi-radio mesh network system supporting at least two different wireless communication standards according to an exemplary embodiment of the present invention.

FIG. 2 is a block diagram of a multi-radio mesh network system supporting at least two different wireless communication standards according to an exemplary embodiment of the present invention. The multi-radio mesh network system supporting at least two different wireless communication standards according to an exemplary embodiment of the present invention comprises a wireless access switching module 100 and a forwarder 300, and further comprises a neighbor provider 400, a neighbor generator 500, and a multi-wireless-path selector 600. The wireless access switching module 100 includes a data converter 200 and a de-queue processor 700.

When a first wireless link 31 for transmitting user data is down, or a fault occurs in the first wireless link 31 for some reason, the user data cannot be transmitted. In this case, the wireless access switching module 100 switches the user data, which is en-queued in the queue of the first wireless link 31 and retained on standby, to an available second wireless link 32. In this exemplary embodiment, only the first and second wireless links 21 and 32, respectively, are described, but there may be more wireless links.

Meanwhile, the wireless access switching module 100 searches a forwarding information base (FIB) 20 generated by the multi-wireless-path selector 600 so as to select a wireless link for the forwarder to transmit the user data, and attempts to transmit the user data through the selected wireless link to determine whether there is a fault in the wireless link. In addition, when a fault occurs in the wireless link, the wireless access switching module 100 re-searches the FIB, checks a next wireless link (hop), and then switches to an existing wireless link.

In this regard, the data converter 200 of the wireless access switching module 100 changes a frame structure according to different wireless access techniques.

According to the selection of a user, the de-queue processor 700 of the wireless access switching module 100 de-queues only the corresponding frame among the user data en-queued in a wireless link in which a fault has occurred, and re-queues it in another wireless link, or de-queues all of the user data en-queued in the wireless link in which a fault has occurred, and re-queues it in another wireless link. The change is performed in an upper media access control (MAC) layer.

Figure 5:
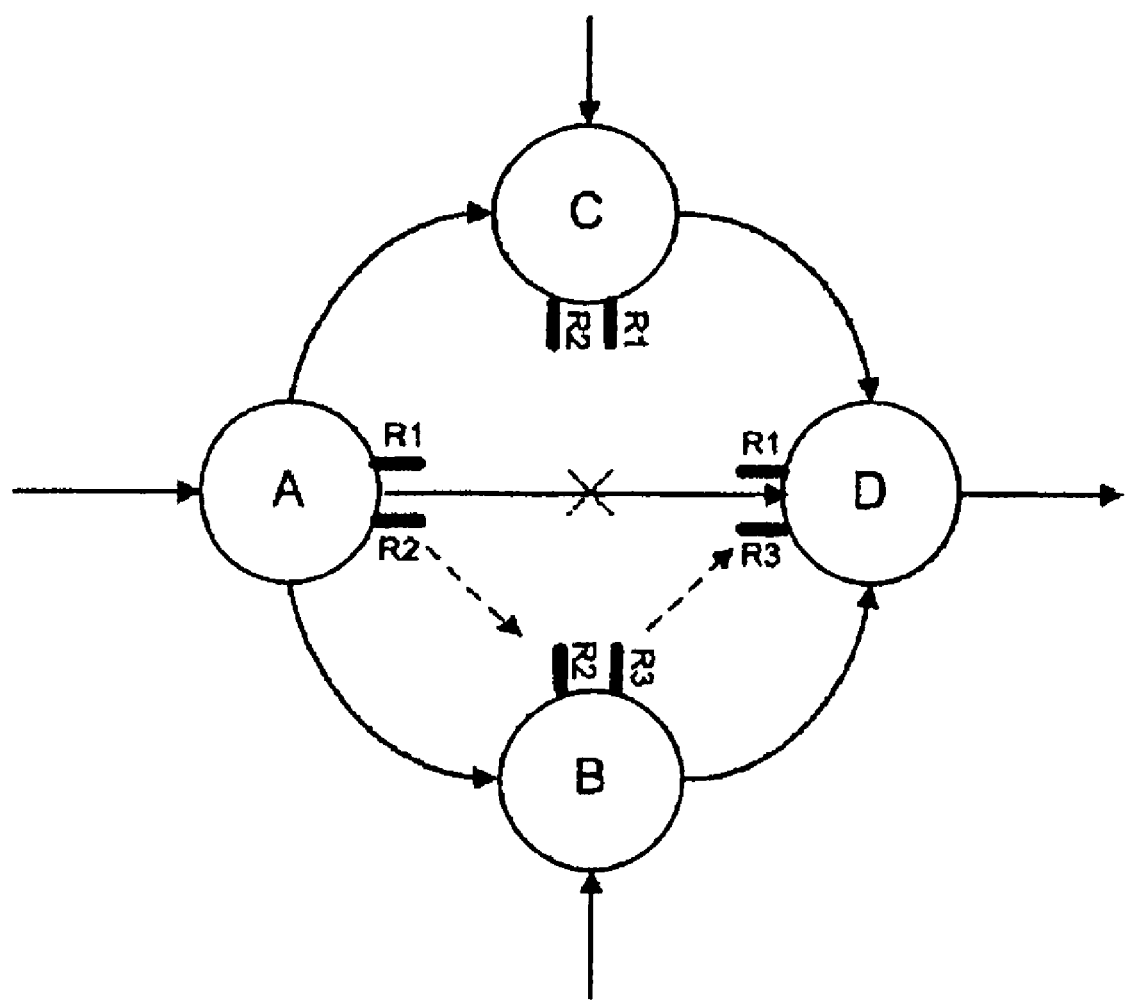
FIG. 5 illustrates a multi-radio mesh network according to the multi-radio mesh network system supporting at least two different wireless communication standards shown in FIG. 2, and the method of controlling the same shown in FIG. 3.

When access is possible through the second wireless link 32, the forwarder 300 searches for a local neighbor directly connected to a transmitting node and a receiving node, and forwards the user data through the local neighbor. Meanwhile, when there is no local neighbor, the forwarder 300 forwards the user data through a common neighbor to which the transmitting node and the receiving node are connected in common. In this respect, as illustrated in FIG. 5, nodes A and D have a local neighbor through a wireless link R1, and have a common neighbor node C using the wireless link R1 and a common neighbor node B using a wireless link R3.

The neighbor provider 400 provides its neighbor information to a neighboring node.

The neighbor generator 500 generates a neighbor table 10 based on neighbor information received from the neighboring node. In the latter respect, the neighbor information includes information on each wireless link established through the corresponding node.

The multi-wireless-path selector 600 generates the FIB 20 with reference to the neighbor table 10. In this respect, the FIB 20 includes destination information of the user data and neighbor information consisting of the same wireless link.

Descriptions of general functions and detailed operations of the above-mentioned components will be omitted. Only operations directly associated with the present invention will be described below.

First, the neighbor provider 400 provides its neighbor information to a neighboring node, and the neighbor generator 500 simultaneously generates the neighbor table 10 based on neighbor information received from the neighboring node, as shown in Table 1.

TABLE 1

| Neighbor ID Node A | Node B (R2 and R3) | Node C (R1 and R2) | Node D (R1 and R3) | |
|---|---|---|---|---|
| MAC 2 | SN 1 | SN 2 | ... | SN n |
| ... | ... | ... | ... | |
| MAC n | SN 1 | SN 2 | ... | SN n |

Subsequently, the multi-wireless-path selector 600 generates the FIB 20 with reference to the neighbor table 10 as shown in Table 2.

TABLE 2

| Destination | Local neighbor | Common neighbor | | |
|---|---|---|---|---|
| Node D | R1 | R1 R3 | Node C Node B | |
| ... | ... | ... | ... | ... |
| Next hop MAC k | SN 1 | SN 2 | ... | SN n |

When the wireless access switching module 100 checks the generated FIB 20 and selects the first wireless link 31, the forwarder 300 en-queues user data in the queue of the first wireless link 31.

Subsequently, the forwarder 300 transmits the user data en-queued in the queue of the first wireless link 31 through the first wireless link 31.

When the first wireless link 31 for transmitting user data is down, or a fault occurs in the first wireless link 31 for some reason, the user data cannot be transmitted through the first wireless link 31. In this case, the wireless access switching module 100 switches the user data, en-queued in the queue of the first wireless link 31 and retained on standby, to the second wireless link 32.

According to the selection of a user, the wireless access switching module 100 de-queues only the corresponding frame among the user data en-queued in a wireless link in which a fault has occurred, and re-queues it in another wireless link, or de-queues all of the user data en-queued in the wireless link in which a fault has occurred, and re-queues it in another wireless link.

In this regard, the data converter 200 does not perform data conversion when the first and second wireless links 31 and 32, respectively, conform to the same wireless communication standard, but performs data conversion only when the first and second wireless links 31 and 32, respectively, conform to different wireless communication standards.

Subsequently, the forwarder 300 switches from the first wireless link 31 to the second wireless link 32, and transmits the user data re-queued in the queue of the second wireless link 32 through the second wireless link 32.

A method of controlling the multi-radio mesh network system supporting at least two wireless communication standards and having the above-described constitution according to an exemplary embodiment of the present invention will be described below.

Figure 3:
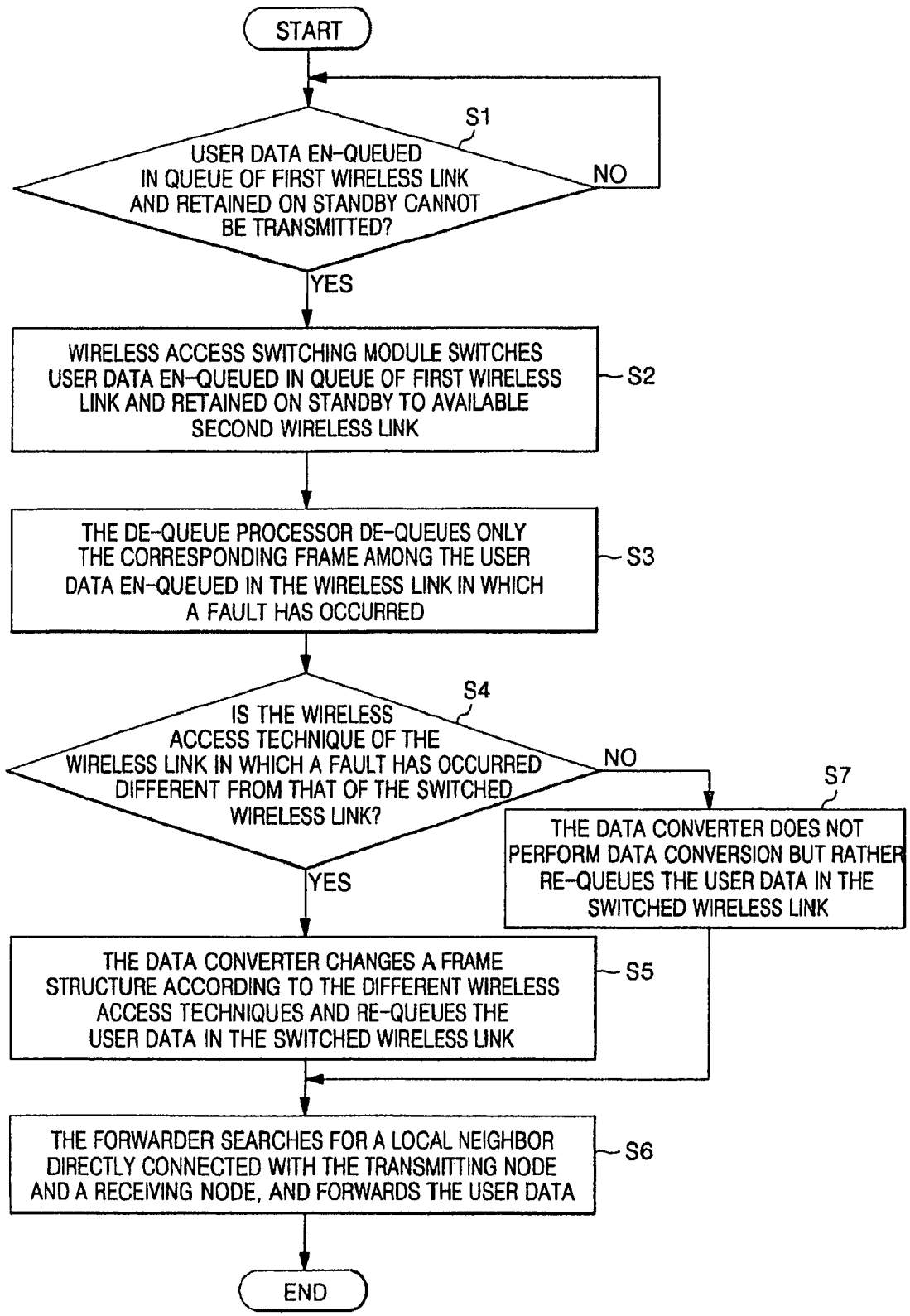
FIG. 3 is a flowchart showing a method of controlling a multi-radio mesh network system supporting at least two different wireless communication standards according to an exemplary embodiment of the present invention.

FIG. 3 is a flowchart showing a method of controlling a multi-radio mesh network system supporting at least two different wireless communication standards according to an exemplary embodiment of the present invention.

First, the multi-wireless-path selector 600 provides its neighbor information to a neighboring node.

The neighbor generator 500 generates the neighbor table 10 based on neighbor information received from the neighboring node. In this respect, the neighbor information includes information on each wireless link established through the corresponding node.

In addition, the multi-wireless-path selector 600 generates the FIB 20 with reference to the neighbor table 10. In this respect, the FIB 20 includes destination information of user data and neighbor information of the same wireless link.

The wireless access switching module 100 determines whether the user data en-queued in the queue of the first wireless link 31 and retained on standby cannot be transmitted (step S1).

Subsequently, the wireless access switching module 100 switches the user data, en-queued in the queue of the first wireless link 31 and retained on standby, to the available second wireless link 32 (step S2).

Figure 4:
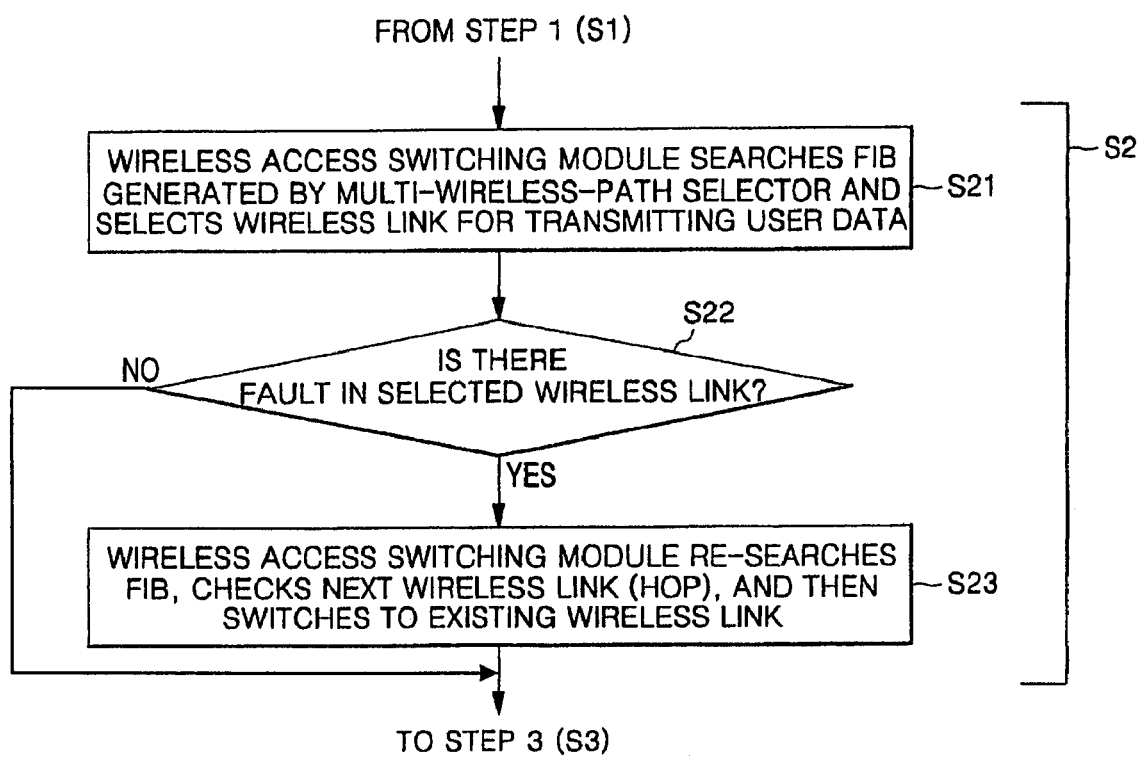
FIG. 4 is a flowchart showing sub-steps of the step of switching a wireless link (S2) in the method of controlling a multi-radio mesh network system supporting at least two different wireless communication standards according to FIG. 3.

Sub-steps of the step of switching to another available wireless link (step S2) will now be described with reference to FIG. 4, which is a flowchart showing sub-steps of the step of switching a wireless link (S2) in the method of controlling a multi-radio mesh network system supporting at least two different wireless communication standards according to FIG. 3.

First, the wireless access switching module 100 searches the FIB 20 generated by the multi-wireless-path selector 600 and selects a wireless link for transmitting user data (step S21).

Subsequently, the wireless access switching module 100 attempts to transmit the user data through the forwarder 300 and the selected wireless link, thereby determining whether there is a fault in the wireless link (step S22).

When it is determined, in the latter determining step (step S22), that there is a fault in the wireless link, the wireless access switching module 100 re-searches the FIB 20, checks a next wireless link (hop), and then switches to an existing wireless link (step S23).

Returning to FIG. 3, the de-queue processor 700 of the wireless access switching module 100 subsequently de-queues only the corresponding frame among the user data en-queued in the wireless link in which a fault has occurred (step S3). Otherwise, the de-queue processor 700 of the wireless access switching module 100 may de-queue all of the user data en-queued in the wireless link in which a fault has occurred, and re-queue it in another wireless link. The change is performed in the upper MAC layer.

The wireless access switching module 100 then determines whether the wireless access technique of the wireless link in which a fault has occurred is different from that of the switched wireless link (step S4).

When the wireless access techniques are different from each other, the data converter 200 of the wireless access switching module 100 changes a frame structure according to the different wireless access techniques, and re-queues the user data in the switched wireless link (step S5).

Subsequently, when access is possible through the second wireless link 32, the forwarder 300 searches for a local neighbor directly connected to the transmitting node and a receiving node, and forwards the user data (step S6). Meanwhile, when there is no local neighbor, the forwarder 300 forwards the user data through a common neighbor to which the transmitting node and the receiving node are connected in common.

When it is determined, in the determination step (step S4), that the wireless access techniques are identical, the data converter 200 of the wireless access switching module 100 does not perform data conversion but rather re-queues the user data in the switched wireless link (step As described above, according to the inventive multi-radio mesh network system supporting at least two wireless communication standards and the inventive method of controlling the same, available multi-wireless resources can be used more efficiently, flexibly and optimally than conventional multi-radio transmission diversity up to the last moment, thereby reducing re-transmission and packet drop. Thus, each hop supports fast data forwarding to improve network performance.

While the present invention has been described with reference to exemplary embodiments thereof, it will be understood by those skilled in the art that various changes in form and detail may be made therein without departing from the scope of the present invention as defined by the following claims.

What is claimed is:

1. A method of controlling a multi-radio mesh network system supporting at least two different wireless communication standards, the method comprising:
    determining, by a wireless access switching module, whether user data en-queued in a queue of a first wireless link cannot be transmitted;
    switching, by the wireless access switching module, the user data en-queued in the queue of the first wireless link to an available second wireless link in response to determining that the user data en-queued in the queue of the first wireless link cannot be transmitted;
    changing, by the wireless access switching module, a frame structure when the first wireless link and the second wireless link conform to different wireless access techniques; and
    when access is possible through the available second wireless link, searching, by a forwarder, for a local neighbor directly connected to a transmitting node and a receiving node, and forwarding the user data,
    wherein changing a frame structure comprises receiving a user selection to determine whether to forward one frame of the en-queued user data or all the en-queued user data.

2. The method of claim 1, further comprising:
    providing neighbor information to a neighboring node; and
    generating a neighbor table based on neighbor information received from the neighboring node.

3. The method of claim 2, wherein the neighbor information comprises information on each wireless link established through a node.

4. The method of claim 2, further comprising:
    generating, by a multi-wireless-path selector, a forwarding information base (FIB) with reference to the neighbor table.

5. The method of claim 4, wherein the FIB comprises destination information of the user data and neighbor information of a wireless link.

6. The method of claim 2, wherein of switching the user data to an available second wireless link comprises:

searching, by the wireless access switching module, a forwarding information base (FIB) generated by a multi-radio path selector, and selecting a wireless link for transmitting the user data;

attempting, by the wireless access switching module, to transmit the user data through the selected wireless link, and determining whether the wireless link has a fault; and in response to determining that the wireless link has a fault, re-searching, by the wireless access switching module, the FIB, checking a next wireless link, and switching to an existing wireless link.

7. The method of claim 2, wherein searching, by a forwarder, for a local neighbor directly connected to the transmitting node and the receiving node and forwarding the user data comprises forwarding the user data through a common neighbor to which the transmitting node and the receiving node are connected in common when no local neighbor can be detected.

8. The method of claim 1, wherein changing, by the wireless access switching module, the frame structure to when the first wireless link and the second wireless link conform to different wireless access techniques comprises de-queuing, in the first wireless link, and re-queuing, in the second wireless link, the corresponding frame among the user data en-queued in the queue of the first wireless link in which a fault has occurred.

9. The method of claim 1, wherein changing, by the wireless access switching module, a frame structure when the first wireless link and the second wireless link conform to different wireless access techniques comprises de-queuing, in the first wireless link, and re-queuing, in the second wireless link, all the user data en-queued in the first wireless link in which a fault has occurred.

10. The method of claim 9, wherein changing, by the wireless access switching module, a frame structure when the first wireless link and the second wireless link conform to different wireless access techniques comprises performing a change in an upper media access control (MAC) layer.

11. The method of claim 8, wherein changing, by the wireless access switching module, a frame structure when the first wireless link and the second wireless link conform to different wireless access techniques comprises performing a change in an upper media access control (MAC) layer.

12. A multi-radio mesh network system supporting at least two different wireless communication standards, the system comprising:

a wireless access switching module to switch user data en-queued in a queue of a first wireless link to an available second wireless link in response to the first wireless link being unable to transmit the user data or in response to occurrence of a fault in the first wireless link;

a de-queue processor to de-queue the user data en-queued in the queue of the first wireless link in which the fault has occurred, and re-queuing the user data in the available second wireless link; and a forwarder to search for a local neighbor directly connected to a transmitting node and a receiving node when the user data can be transmitted through the available second wireless link, and to forward the user data, wherein the de-queue processor de-queues one frame of the en-queued user data or all the en-queued user data according to a user selection.

13. The multi-radio mesh network system of claim 12, further comprising:

a neighbor provider to provide neighbor information to a neighboring node; and a neighbor generator to generate a neighbor table based on neighbor information received from the neighboring node.

14. The multi-radio mesh network system of claim 13, wherein the neighbor information comprises information on each wireless link established through a node.

15. The multi-radio mesh network system of claim 13, further comprising a multi-wireless-path selector to generate a forwarding information base (FIB) with reference to the neighbor table.

16. The multi-radio mesh network system of claim 15, wherein the FIB comprises destination information of the user data and neighbor information of a wireless link.

17. The multi-radio mesh network system of claim 13, wherein the wireless access switching module searches a forwarding information base (FIB) generated by a multi-wireless-path selector, and selects a wireless link for the forwarder to use in transmitting the user data, attempts to transmit the user data through the selected wireless link, determines whether the fault has occurred in the wireless link, and when the fault occurs in the wireless link, re-searches the FIB, checks a next wireless link, and switches to an existing wireless link.

18. The multi-radio mesh network system of claim 12, further comprising a data converter to change a frame structure when the wireless access switching module switches between different wireless access techniques.

19. The multi-radio mesh network system of claim 18, wherein the data converter de-queues all the user data en-queued in the first wireless link in which the fault has occurred, and re-queues the user data in the second wireless link if the user selection indicates that all the en-queued user data should be de-queued.

20. The multi-radio mesh network system of claim 19, wherein the change of frame structure is performed in an upper media access control (MAC) layer.

21. The multi-radio mesh network system of claim 18, wherein the change of frame structure is performed in an upper media access control (MAC) layer.

22. The multi-radio mesh network system of claim 13, wherein, when no local neighbor can be detected, the forwarder forwards the user data through a common neighbor to which the transmitting node and the receiving node are connected in common.

* * * * *